United States Patent [19]

Diederich, Jr. et al.

[11] 4,411,127
[45] Oct. 25, 1983

[54] FLOATING WINDGUARD

[75] Inventors: Anthony F. Diederich, Jr., Terre Hill; Peter P. Haldeman, Reinholds; Willis R. Campbell, Ephrata, all of Pa.

[73] Assignee: Sperry Corporation, New Holland, Pa.

[21] Appl. No.: 365,704

[22] Filed: Apr. 5, 1982

[51] Int. Cl.³ .............................................. A01D 89/00
[52] U.S. Cl. ..................................................... 56/364
[58] Field of Search .................. 56/364, 341, 342, 343

[56] References Cited

U.S. PATENT DOCUMENTS

| | | | |
|---|---|---|---|
| 2,430,734 | 11/1947 | Raney et al. | 56/364 |
| 2,458,713 | 1/1949 | Linderer | 56/364 |
| 2,524,233 | 10/1950 | Russell | 56/364 |
| 2,872,772 | 2/1959 | Nolt | 56/364 |
| 3,924,391 | 12/1975 | Cheatum | 56/364 |

Primary Examiner—Jay N. Eskovitz
Attorney, Agent, or Firm—Darrell F. Marquette; Larry W. Miller; Frank A. Seemar

[57] ABSTRACT

A windguard for use on the pick-up mechanism of a crop harvesting machine. The windguard automatically adjusts to varying sizes of windrows of crop material as the machine and its pick-up mechanism are being operated. The windguard has an unlimited number of adjustment positions for different sizes of windrows.

8 Claims, 3 Drawing Figures

FLOATING WINDGUARD

BACKGROUND OF THE INVENTION

Pick-up mechanisms are used on crop harvesting machines such as hay balers to lift crop material from the ground. These pick-up mechanisms are usually equipped with a windguard for holding down the crop material to prevent it from being blown off the pick-up mechanism and to provide even flow of crop material.

A conventional type of windguard includes a bar extending across the front of the pick-up mechanism with a plurality of tines attached to the bar along its length extending rearwardly over the pick-up mechanism. This type of windguard may be manually adjusted for different sizes of windrows of crop material by positioning the bar and the tines closer to the pick-up mechanism for small windrows or farther away from the pick-up mechanism for large windrows. If the windguard is adjusted for small windrows and a large windrow is encountered, the windguard bar and tines may be too close to the pick-up mechanism to accommodate the large windrow. This could cause plugging of the pick-up mechanism. If the windguard is adjusted for large windrows and a small windrow is encountered, the windguard tines may be too far away from the pick-up mechanism to protect the small windrow. This could result in wind loss of crop material. Furthermore, the number of windguard adjustment positions is limited and is not adequate to handle all windrow sizes.

It is an object of this invention to provide an improved windguard that automatically adjusts to varying windrow size.

It is another object of this invention to provide an improved windguard having an unlimited number of adjustment positions for different windrow sizes.

SUMMARY OF THE INVENTION

The present invention provides a windguard for use on a pick-up mechanism which is attachable to the frame of a crop harvesting machine. The windguard includes a bar extending transversely of the pick-up mechanism with a plurality of tines attached to the bar along the length thereof. The bar is movable in a first direction upward and away from the pick-up mechanism and in a second direction downward and toward the pick-up mechanism during operation of the pick-up mechanism. The windguard of the present invention may also include first and second links supporting the bar. The first and second links would be pivotable in one direction to move the bar in the first direction and in the opposite direction to move the bar in the second direction. In the preferred embodiment of the windguard of the present invention, the first link is pivotally connected to the frame of the crop harvesting machine, and the second link is pivotally connected to the pick-up mechanism.

DESCRIPTION OF THE PREFERRED EMBODIMENT

Figure 1:
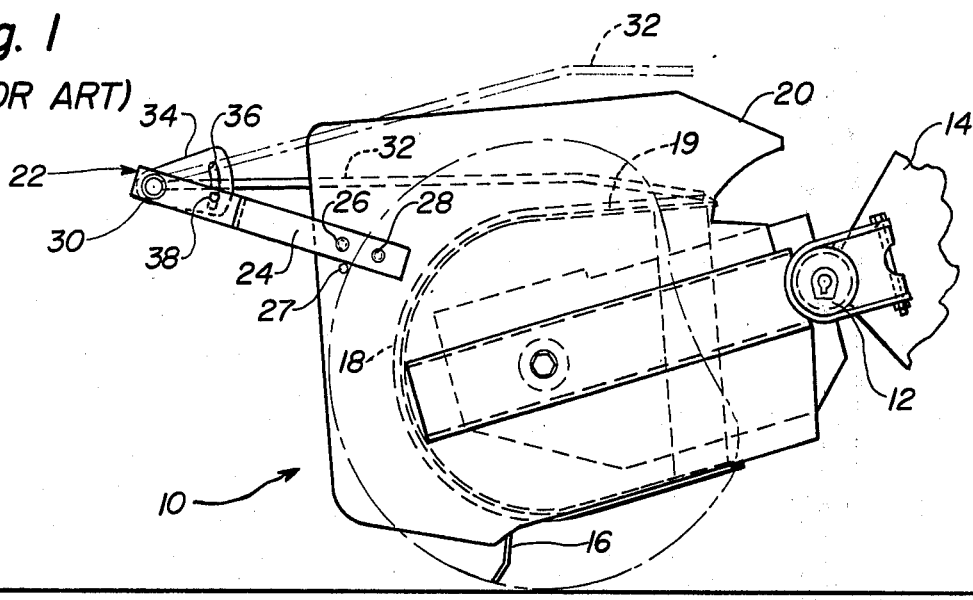
FIG. 1 is a side elevational view of a pick-up mechanism equipped with a conventional type of windguard.

Referring to FIG. 1, a conventional type of pick-up mechanism 10 is attached by a pivot connection 12 to the frame 14 of a crop harvesting machine such as a hay baler. The pick-up mechanism 10 includes a series of fingers 16 which project through slots between arcuate stripper plates 18. The pick-up mechanism 10 also includes side panels 20. The fingers 16 rotate in the path and direction indicated to pick up windrowed crop material from the ground. This type of pick-up mechanism is shown in U.S. Pat. No. 2,872,772.

A windguard 22 of a conventional type is mounted on the pick-up mechanism 10 and includes brackets 24 fastened to the side panels 20 at locations 26 and 28 by bolts. A bar or rod 30 extends transversely between and is rotatably mounted in the brackets 24. A plurality of tines 32 is rigidly attached to the bar 30 along the length thereof. Limiting brackets 34 are rigidly attached to the bar 30 adjacent the brackets 24. Each limiting bracket 34 has a slot 36 therein engaged with a pin 38 mounted on a bracket 24. The tines 32 are normally in the lower position shown in FIG. 1 where they rest on the stripper plates 18 when the pick-up mechanism 10 is not in use. During operation of the pick-up mechanism 10, the fingers 16 feed crop material across the upper portions 19 of the stripper plates 18. The windguard tines 32 are lifted upward by the crop material but serve to keep the crop material moving across the deck 19 and in engagement with the fingers 16. This upward movement of the tines 32 is accomplished by rotating the bar 30 in the brackets 24. The pin 38 and slot 36 arrangement limits the rotational movement of the bar 30 thus limiting the upward movement of the tines 32.

The windguard 22, as seen in FIG. 1, is set to accommodate relatively large (i.e., thick) windrows. The windguard 22 may be adjusted to accommodate small (i.e., thin) windrows by fastening the brackets 24 to the side panels 20 at locations 27 and 28 rather than at locations 26 and 28. This moves the bar 30 and the attached tines 32 closer to the fingers 16 and the stripper plates 18.

Figure 2:
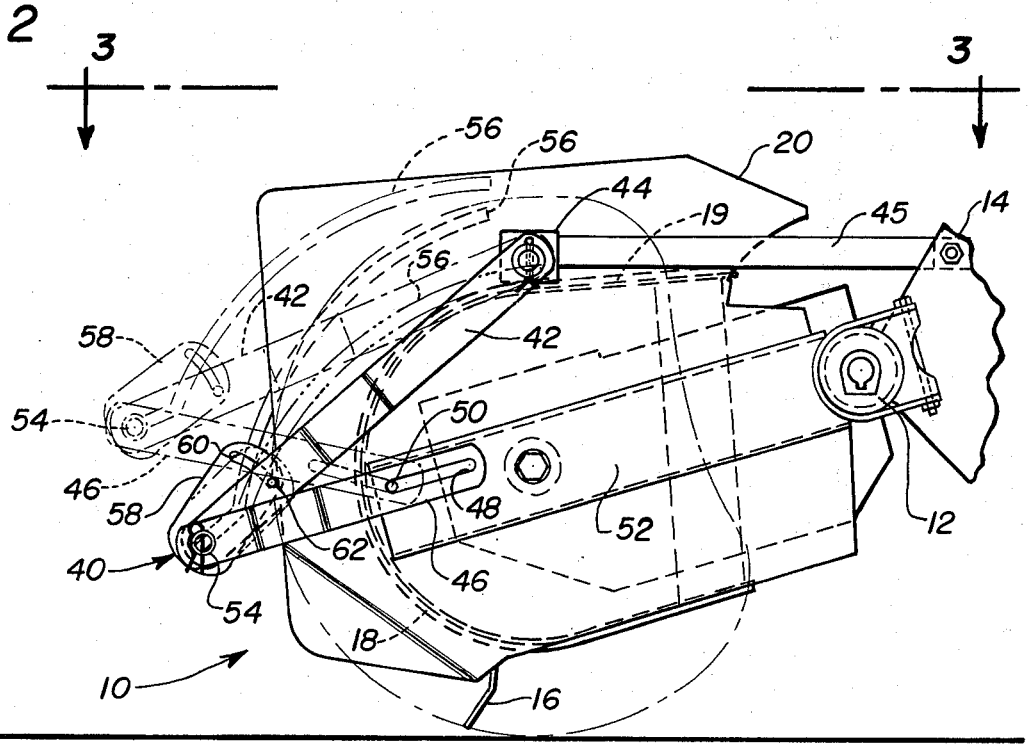
FIG. 2 is a side elevational view of a pick-up mechanism equipped with a windguard embodying the present invention.
Figure 3:
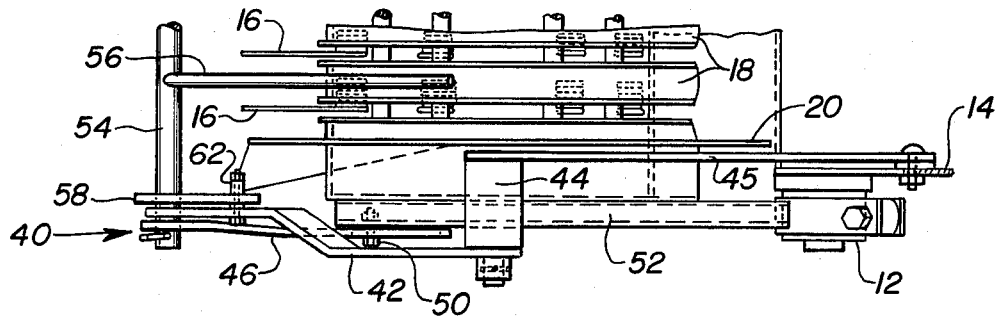
FIG. 3 is a sectional view taken along lines 3—3 in FIG. 2.

Referring now to FIG. 2, the preferred embodiment of the windguard of the present invention is designated 40 and is mounted on the same conventional type of pick-up mechanism 10. The windguard 40 includes long links 42 positioned at the sides of the pick-up mechanism 10 and pivotally mounted on bosses 44 that are connected to the harvesting machine frame 14 by brackets 45. Alternatively, the bosses 44 could be connected to the side panels 20 of the pick-up mechanism 10. The windguard 40 also includes short links 46 positioned at the sides of the pick-up mechanism 10. Each link 46 has a slot 48 engaged with a pin member 50. The pin members 50 are mounted in brackets 52 at the sides of the pick-up mechanism 10. A bar or rod 54 extends transversely between and is rotatably engaged in the links 42 and 46. A plurality of tines 56 is rigidly attached to the bar 54 along the length thereof. Limiting brackets 58 are rigidly attached to the bar 54 adjacent the links 42. Each limiting bracket 58 has a slot 60 therein engaged with a pin member 62 mounted in a link 42.

When the pick-up mechanism 10 of FIG. 2 is not in use, the tines 56 of the windguard 40 are normally in the lower position shown where they rest on the stripper plates 18 and the links 42 and 46 are in the position shown in full lines. During operation of the pick-up mechanism 10, crop material delivered across the stripper plate upper portions 19 by the fingers 16 will lift the tines 56 upwardly. This upward movement of the tines 56 is accomplished by rotating the bar 54 in the links 42 and 46. The pin 62 and slot 60 arrangement limits this rotational movement of the bar 54.

The windguard 40 will handle a relatively small (i.e., thin) windrow with the links 42 and 46 in the full line position shown in FIG. 2. If a large (i.e., thick) windrow is encountered, the links 42 and 46 pivot upwardly toward the position shown in phantom lines as the bar 54 and the attached tines 56 are lifted upward and away from the fingers 16 and the stripper plates 18 by the crop material to accommodate the large windrow. This prevents plugging of the pick-up mechanism 10. The upward pivoting movement of the links 42 and 46 is limited by the pin 50 and slot 48 arrangement. If a small windrow is then encountered again, the links 42 and 46 pivot back downwardly toward their full line position as the bar 54 and the attached tines 56 drop downward and toward the fingers 16 and the stripper plates 18 to protect the small windrow from wind loss. The downward pivoting movement of the links 42 and 46 is also limited by the pin 50 and slot 48 arrangement.

As the size of the windrow varies during operation of the pick-up mechanism 10, the bar 54 and the tines 56 will float upward and downward with respect to the fingers 16 and the stripper plates 18 to automatically adjust the windguard 40 to varying windrow size and to provide the windguard 40 with an unlimited number of adjustment positions for different windrow sizes.

The following claims are intended to cover all modifications and variations of the preferred embodiment of the invention without departing from the spirit and scope of the invention.

Having thus described the invention, what is claimed is:

1. A windguard for use on a pick-up mechanism attachable to the frame of a crop harvesting machine, said windguard comprising:
   (a) a bar extending transversely of said pick-up mechanism;
   (b) a plurality of tines attached to said bar along the length thereof;
   (c) said bar being movable in a first direction upward and away from said pick-up mechanism and in a second direction downward and toward said pick-up mechanism during operation of said pick-up mechanism;
   (d) link means supporting sid bar, said link means being pivotable in one direction to move said bar in said first direction and in the opposite direction to move said bar in said second direction; and
   (e) said bar being rotatably connected to said link means.

2. The windguard defined in claim 1, further comprising a pin and slot connection between said link means and said pick-up mechanism.

3. The windguard defined in claim 1, wherein said link means comprises first and second links each being pivotable in said one direction and said opposite direction.

4. The windguard defined in claim 1, further comprising means for limiting the pivotable movement of said link means in at least said one direction.

5. The windguard defined in claim 1, wherein said bar is movable in said first and second directions to substantially vary the distance between said bar and said pick-up mechanism.

6. The windguard defined in claim 1, further comprising means for limiting the rotational movement of said bar.

7. A windguard for use on a pick-up mechanism attachable to the frame of a crop harvesting machine, said windguard comprising:
   (a) a bar extending transversely of said pick-up mechanism;
   (b) a plurality of tines attached to said bar along the length thereof;
   (c) said bar being movable in a first direction upward and away from said pick-up mechanism and in a second direction downward and toward said pick-up mechanism during operation of said pick-up mechanism;
   (d) link means supporting said bar, said link means being pivotable in one direction to move said bar in said first direction and in the opposite direction to move said bar in said second direction;
   (e) said link means including first and second links each being pivotable in said one direction and said opposite direction; and
   (f) said first link being pivotally connected to the frame of said crop harvesting machine, and said second link being pivotally connected to said pick-up mechanism.

8. The windguard defined in claim 7, further comprising a pin and slot connection between said second link and said pick-up mechanism for limiting the pivotable movement of said first and second links in at least said one direction.

* * * * *